United States Patent [19]
Levine

[11] Patent Number: 5,420,647
[45] Date of Patent: May 30, 1995

[54] T.V. VIEWING AND RECORDING SYSTEM

[75] Inventor: Michael R. Levine, Boca Raton, Fla.

[73] Assignee: Smart VCR Limited Partnership, Ann Arbor, Mich.

[21] Appl. No.: 5,704

[22] Filed: Jan. 19, 1993

Related U.S. Application Data

[63] Continuation-in-part of Ser. No. 5,727, Jan. 19, 1993.

[51] Int. Cl.⁶ .................................................. H04N 5/782
[52] U.S. Cl. ..................................... 348/734; 358/335
[58] Field of Search .................... 358/194.1, 335, 181, 358/191.1; 340/825.72, 825.60; 359/142; H04N 5/782, 17/02, 7/167

[56] References Cited

U.S. PATENT DOCUMENTS

| | | | |
|---|---|---|---|
| 4,527,204 | 7/1985 | Kozakai et al. | 360/33.1 |
| 4,630,133 | 12/1986 | Long | 358/335 |
| 4,717,970 | 1/1988 | Long | 358/335 |
| 4,745,549 | 5/1988 | Hashimoto | 364/402 |
| 4,751,581 | 6/1988 | Ishiguro et al. | 358/194.1 |
| 4,841,368 | 6/1989 | Rumbolt et al. | 358/194.1 |
| 4,908,713 | 3/1990 | Levine | 358/335 |
| 4,963,994 | 10/1990 | Levine | 358/335 |
| 4,977,455 | 12/1990 | Young | 358/142 |
| 5,034,819 | 7/1991 | Tsukageshi | 358/191.1 |
| 5,038,211 | 8/1991 | Hallenbeck | 358/142 |
| 5,046,093 | 9/1991 | Wachob | 380/20 |
| 5,081,534 | 1/1992 | Geiger et al. | 358/194.1 |
| 5,151,789 | 9/1992 | Young | 358/194.1 |

OTHER PUBLICATIONS

Video Magazine, Nov. 1992 p. 26–27 RCA VR667HF VHS VCR by Berger-Braithwaite Labs.
"TAC-Timer", Zenith Electronics Corporation, 1986 NCTA Technical Papers, pp. 197–206.

Primary Examiner—Victor R. Kostak
Assistant Examiner—Nathan J. Flynn
Attorney, Agent, or Firm—Gifford, Krass

[57] ABSTRACT

In a television viewing system, a VCR adapted for use with a source of cable TV, a remotely controllable cable box and a remotely controllable TV receiver provides means to determine all channels tunable by the various tuners, including pay channels. A memory disposed within the VCR stores operative control codes for the cable box and TV. The VCR incorporates switches adapted to interconnect the various components in a variety of configurations. The VCR also incorporates an infrared transmitter operative to transmit control signals to the cable box and TV receiver. Upon receipt of user inputs specifying the desired mode of operation, a controller within the VCR adjusts the switching positions to achieve an optimum configuration for the system components to perform user selections options and transmits remote control codes to the cable box and the TV receiver to place them in condition to enable the user command.

17 Claims, 5 Drawing Sheets

| CHANNEL | VCR | TV | CABLE BOX |
|---|---|---|---|
| 02 | 0 | 0 | 1 |
| 03 | 0 | 0 | 0 |
| 04 | 1 | 1 | 1 |
| • | • | • | • |
| • | • | • | • |
| • | • | • | • |

T.V. VIEWING AND RECORDING SYSTEM

REFERENCE TO RELATED APPLICATION

This application is a continuation-in-part of patent application U.S. Ser. No. 08,005,727, filed Jan. 19, 1993.

FIELD OF THE INVENTION

This invention relates generally to video recorders and more particularly to a video recorder operative to electronically interconnect and remotely control the operation of an associated cable tuner/descrambler and television receiver in accordance with user view/record requests from the operator.

BACKGROUND OF THE INVENTION

Video recorders, or VCRs, are commonly used in conjunction with television receivers to facilitate the recording of broadcast programming and the playback of pre-recorded cassettes. When the broadcasts are received over a cable system, scrambled channels may be present, which require descrambling before viewing or recording. A cable tuner/descrambler or "cable box," including a remotely controllable multi-signal tuner, is commonly employed to descramble such signals.

To facilitate a particular recording or viewing scenario, the necessary interconnections between the cable box, VCR and TV set may be quite complex, particularly if it is desired to watch one channel while viewing another. Additional complexity arises from the fact that the VCR may be equipped with a capability which allows automatic, unattended recording of a program to be broadcast at a future time. While the programming system may control the VCR tuner in order to receive the desired program at the correct time, the cable-box and TV tuners must also be properly adjusted, at the system level, in order to accommodate the recording-/viewing option.

Further complexity results from the VCR, cable box and TV being typically equipped with separate infrared remote-control transmitters. Although "universal remotes" have been devised which can emulate multiple transmitters, the process of training such devices presents its own challenges to the consumer.

Long U.S. Pat. No. 4,630,133 discloses a video cassette recorder which is adapted to be connected to a multi-channel cable, to a T.V. receiver into both the input and output of the cable box. The V.C.R. incorporates multi-position switches which allow the operator to configure the intraconnection between the units in an optimum manner to achieve a desired viewing or recording function. The operator must manually adjust the switches and independently configure the associated cable box and T.V. receiver to implement an optimum configuration for viewing and/or recording.

My U.S. Pat. No. 5,123,046, discloses a system in which a V.C.R. incorporates an infrared transmitter which allows it to exercise control over the energization and tuning of an associated and remotely controllable cable box.

While both of these innovations facilitate the operation of a television viewing system incorporating a video recorder, cable tuner and T.V. receiver, the problem of configuring the units in an optimum way and controlling their operation still requires a degree of expertise which exceeds the abilities of the average television viewer.

SUMMARY OF THE INVENTION

The present invention is directed toward a system which would allow full transfer and sharing of video or RF-modulated T.V. signals among the components of the television viewing system in much the same way that a computer bus allows data to be transferred between peripherals and would make the realization of an optimum configuration and the adjustment of the system components to operate in consort with one another an automatic function of the system. A preferred embodiment to the invention constitutes a video recorder having connections for receiving a multi-channel program signal source such as cable television, to provide output to an associated television and connections to both the input and output of an associated cable box. The video recorder includes electronically controlled switches which are capable of interconnecting the tuner, record/playback means, signal source, cable box and T.V. in an optimum configuration based on user control inputs. The video recorder includes an infrared transmitter capable of transmitting control codes to both the cable box and the T.V. receiver to adjust their parameters in such a way as to achieve the optimum viewing/recording configuration.

An electronic controller within the VCR receives command signals from an operator pertaining to desired television viewing and recording options. In accordance with these commands, the controller automatically causes the transmitter to send control signals to the cable box and to the TV, and configures the switches to ensure that all system components and tuners meet the desired viewing/recording scenario.

Other advantages of the invention will be made apparent by the following detailed description of the preferred embodiment to the invention. The description makes reference to the accompanying drawings in which:

DETAILED DESCRIPTION OF THE PREFERRED EMBODIMENT

Figure 1:
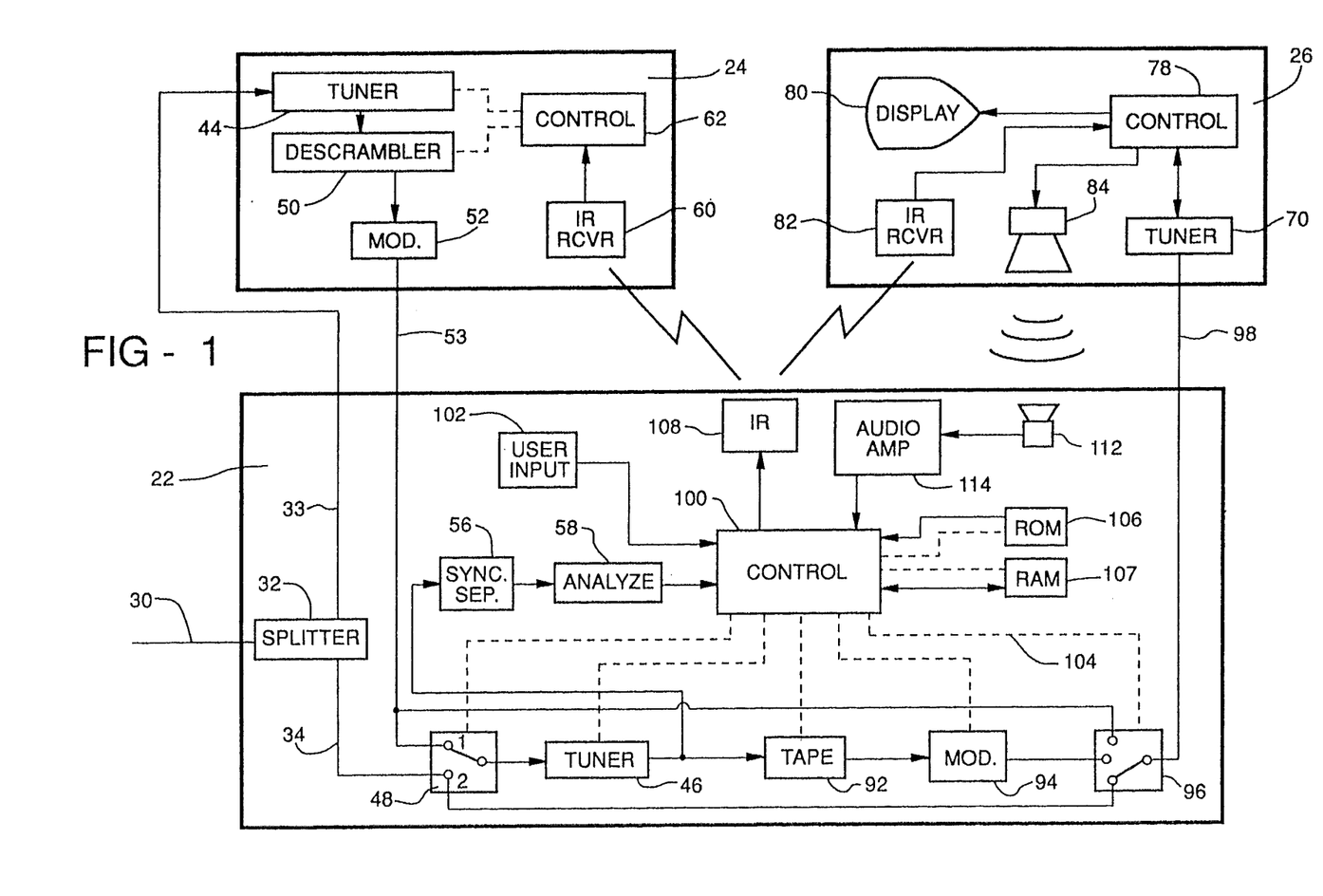
FIG. 1 is a schematic diagram of a preferred embodiment of the present invention including connections to a source of cable television, a cable box and a TV.

Referring to FIG. 1, a video recorder (VCR) 22 formed in accordance with a preferred embodiment of the present invention is shown in block-diagram form along with a typical cable tuner/descrambler or "cable box" 24 and a television receiver (TV) 26. All units are preferably remotely controllable via infrared signals. A multi-program signal source, such as that provided over a television cable 30, is fed to an RF splitter 32 within the VCR 22. The splitter has a first output at 33 which is routed to the input of cable box 24 and a second output at 34 which is utilized within VCR 22.

The output of cable-box tuner 44 feeds a descrambler 50, operative to decipher and demodulate premium or "pay" channels, and the output of the descrambler feeds a modulator 52 which modulates the video signal derived by tuner 44 and reconstructed by descrambler 50, onto an unused VHF channel, channel 3. The modulated signal from the cable box is provided to the V.C.R. 22 on cable 53.

Control codes for the cable box are received by an infrared (IR) receiver 60. A hand-held remote-control transmitter (not shown) is ordinarily used to transmit the codes. The output of IR receiver 60 is interfaced to a cable-box control unit 62, which is typically a programmed microprocessor. In response to control codes received by IR receiver 60, control unit 62 directs overall cable-box operations, including causing tuner 44 to tune to the channel specified by the received signal.

The RF output signal from VCR 22 is delivered to TV 26 via a cable 98. The signal from the VCR is fed to a tuner 70, though in a more sophisticated receiver the signal may branch to additional tuners (not shown) to facilitate operational features such as "picture-in-picture," which enable the viewer to watch the program on one channel while the program on another channel is shown as a small video inset within the main picture.

Tuner 70 interfaces to a control unit 78, preferably a programmed microprocessor, which in turn interfaces to a display 80, usually in the form of a cathode-ray-tube (CRT). TV control codes are received by an infrared receiver 82, which feeds control signals to the control unit 78. The audio portion of the tuned channel is delivered to the viewer by a loud speaker 84, also interfaced to controller 78.

The second output 34 of splitter 32, within the V.C.R., is used as one input to a single throw, double pole, electronically controlled switch 48, the other input being the RF output of the cable box on cable 53. The output of switch 48 feeds a multi-channel tuner 46, which demodulates the incoming RF signal to a video signal for presentation to a video record/playback unit 92, typically a cassette tape recorder/player.

The output of record/playback unit 92 is delivered to an RF modulator 94, which modulates the video signal onto channel 3 The RF modulated signal from block 94 forms one input to a three-input electronically controlled switch 96, the other inputs of switch 96 being the second output of splitter 32 and the output of the cable box tuner on line 53.

The function of switch 48 is to choose the source of program material for the video record/playback unit 92, and the function of switch 96 is to select the source of program material to be viewed on TV 26. It is important to note that while FIG. 1 illustrates the preferred embodiment of the VCR's electronically controlled switching, the inputs to both switch 48 and switch 96 may be expanded to accommodate additional sources of program material, such as a separate satellite receiver input.

The demodulated video output of tuner 46 is also fed to a sync separator 56, which, in turn, feeds a signal analyzer unit 58. The sync separator 56 is used in conjunction with the analyzer 58 to determine if the cable box is capable of descrambling a premium channel carried by cable 30. In the preferred embodiment, the sync separator extracts a horizontal synchronization signal from the video output of tuner 46, and analysis unit 58 examines the signal to see if it occurs on a consistent time base or alternatively, if it is inverted. The functioning of sync separator 56 and analyzer 58 in conjunction with tuner 46 will be discussed further in reference to methods of the present invention for compiling channel attributes.

Figure 6:
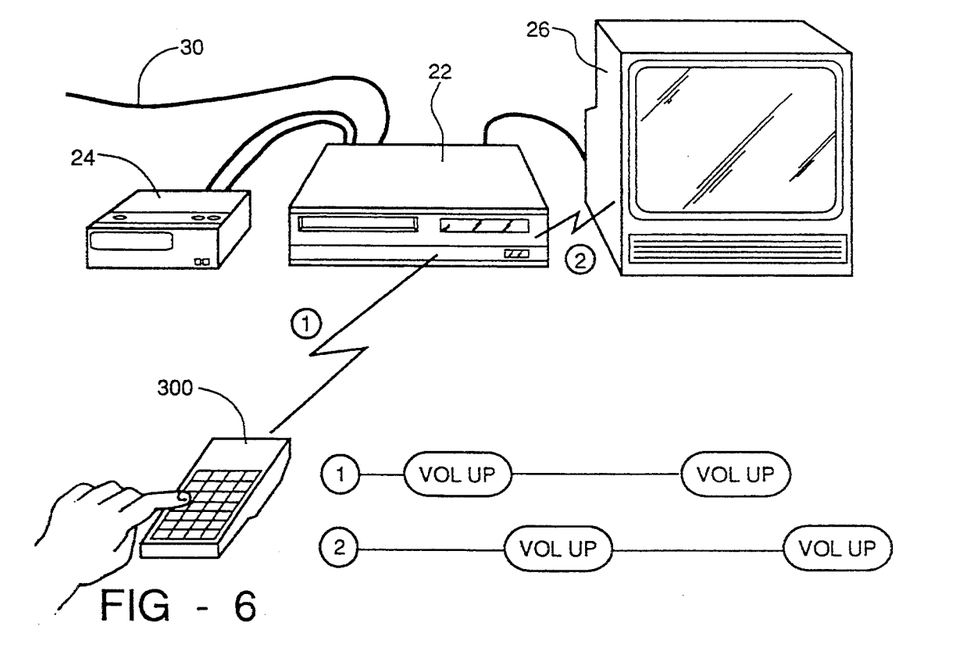
FIG. 6 is an illustration of the interaction among system components upon receipt of a typical command from a remote-control transmitter dedicated to the VCR of the present invention.

A central controller 100 within VCR 22 receives operator commands through a user input 102, preferably constituting a receiver for IR commands generated by a hand-held remote transmitter 300 (FIG. 6). Controller 100 interfaces to and/or directs the operation of various functional units within the VCR, including switches 48 and 96, tuner 46, record/playback unit 92, analyzer 58, audio detector/amp 114 and an infrared remote-control transmitter 108, which is used to energize and tune and otherwise control the cable box 24 and TV 26. The control codes associated with the cable box and TV are preferably stored in a pre-recorded read-only memory (ROM) 106, and channel attributes are stored in a random-access memory (RAM) 107. Both memories also interface to controller 100. Alternatively, the control codes associated with the cable box and TV could be automatically ascertained by the VCR 22 using methods disclosed in my co-pending application Ser. No. 08/005,727, being filed at a substantially even date with this application.

Figure 2:
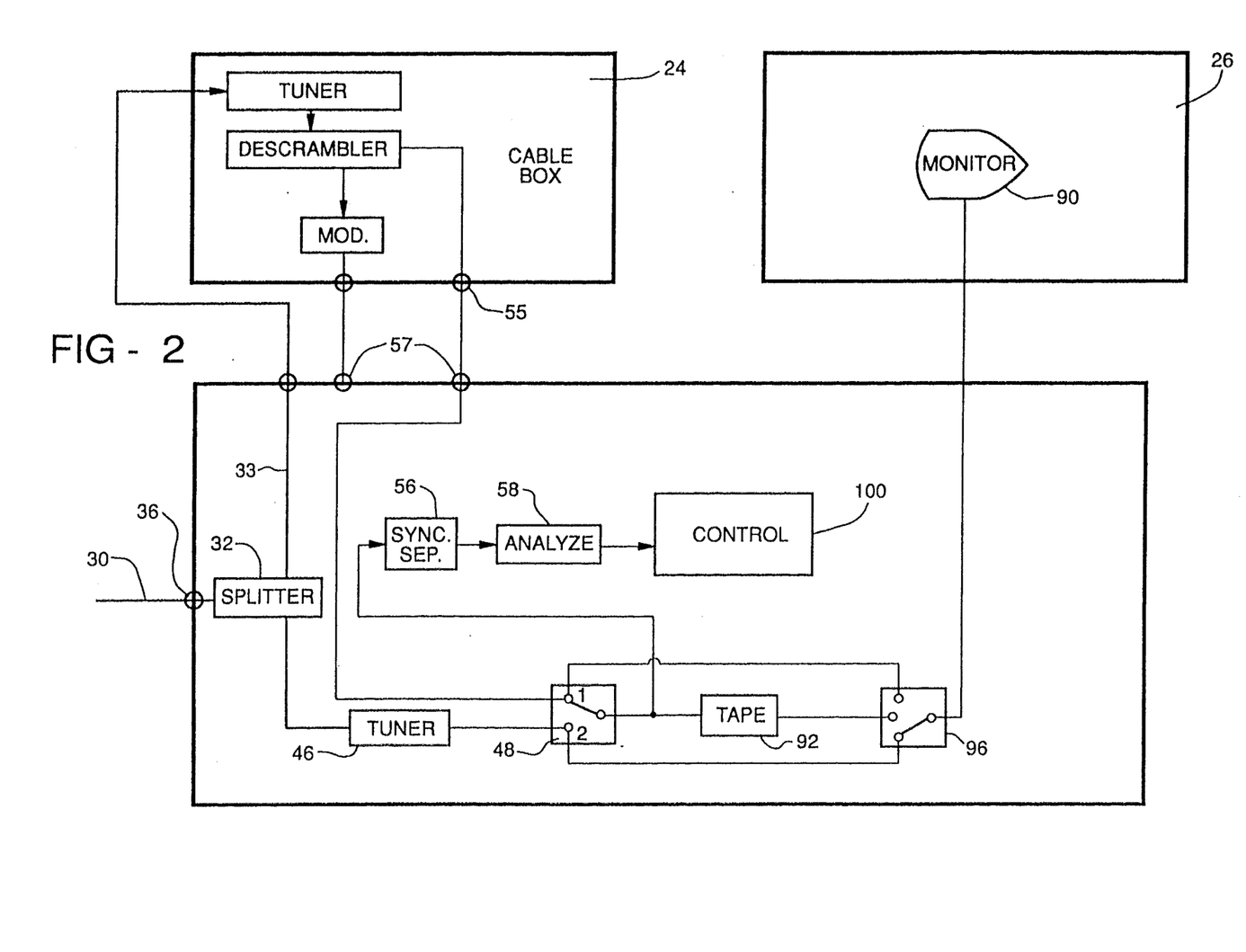
FIG. 2 is a simplified, schematic diagram of an alternative embodiment of the present invention wherein video signals are switched in lieu of RF signals.

FIG. 2 is a simplified schematic diagram of an alternative embodiment of the switching arrangement present invention wherein switches 48 and 96 are used to switch video signals (drawn as thin lines), instead of RF signals (drawn as thick lines). Some cable boxes, such as those which provide the operator with control over the audio portion of the selected channel, demodulate the incoming RF signal and provide demodulated audio and video outputs, typically through a separate set of connectors 55 on the cable-box housing, with cables being used to carry the signals to an associated set of connectors 57 on the VCR. Newer "component" TVs likewise provide the display as a separate video monitor 90 which may be interfaced directly to the audio/video outputs typically found on most VCRs, including the VCR of the present invention.

As exemplified by FIG. 2, the present invention may be configured to switch RF signals on the video inputs or any combination, depending upon the capabilities of the associated modules.

Figure 3:
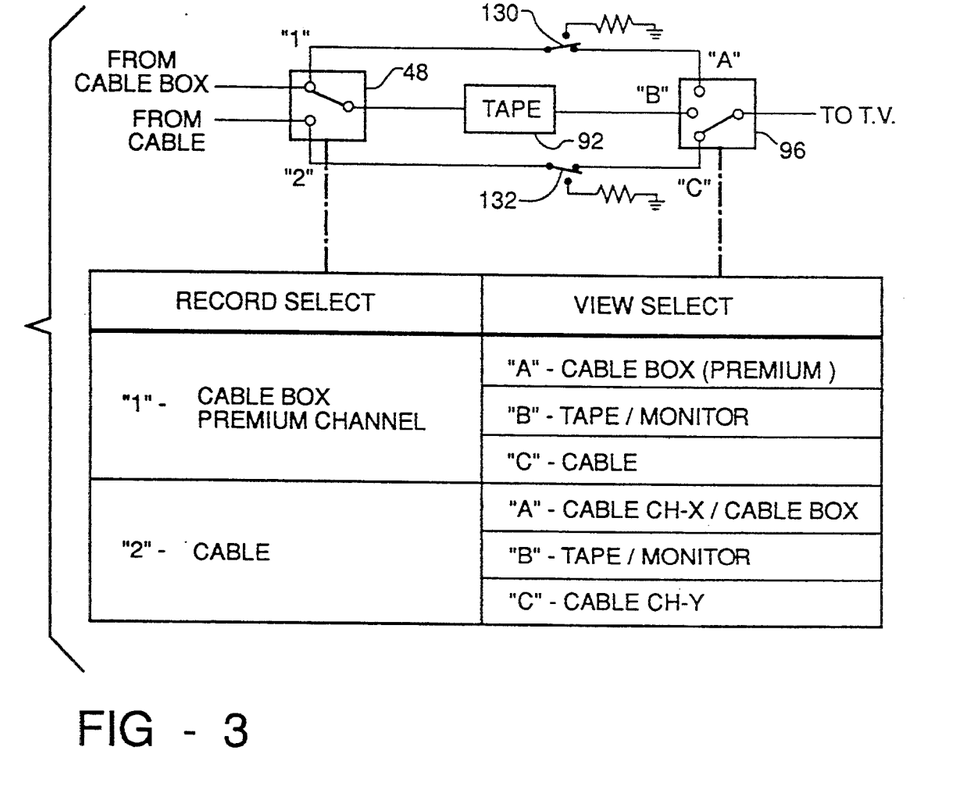
FIG. 3 is a chart of recording and viewing options available as a function of the electrically controlled switching in the VCR of the present invention.

FIG. 3 lists the recording and viewing options available as a function of the electrically controlled switching in the VCR. Switch 48 may be set to position "1" to record a signal from the cable box, including a descrambled channel, or set to position "2" to record a channel directly from the cable. With switch 96 at position "A" the TV or monitor will receive a channel from the cable box, including a descrambled channel. At "B" the TV or monitor will receive the output of the tape unit, and at "C" a channel directly from the cable.

Position "B" could also be used to monitor the program currently being taped but it is anticipated that this switch position will only be used to view a tape once recorded, since positions "A" and "C" would provide a "cleaner" signal for viewing, especially if RF switches are used and the tape output needs to be modulated before viewing. With RF switches it is also important that the signal lines exhibit consistent loading on all positions. Thus, additional switches 130 and 132, shown in FIG. 2, may alternatively be added to ensure that the RF lines are never unloaded or "floating."

Using its infrared transmitter 108 and electrical switches, the VCR of the present invention has the capability to determine which channels which may be tuned by the associated resources on hand, and configure those resources in accordance with operator requests. Although the preferred embodiment embodies the centralized control for this channel determination and configuration within the VCR, the system transmitter and switching could alternatively be located within the cable box, TV or even a hand-held remote unit.

When the VCR is first installed, or when a system resource such as the cable is changed, the VCR automatically scans its inputs to determine available channels. In the preferred embodiment, the tuner 46 is scanned through each channel and the output of sync separator 56 is examined by controller 100 to detect the presence of strong, regular sync pulses which, if present, indicate a tunable channel. An alternative technique for determining whether a signal is present from a system resource may be employed including the presence of an RF signal or any attribute of the underlying video signal, including vertical or horizontal sync, color burst, or any waveform specially encoded for identification purposes.

Figure 4:
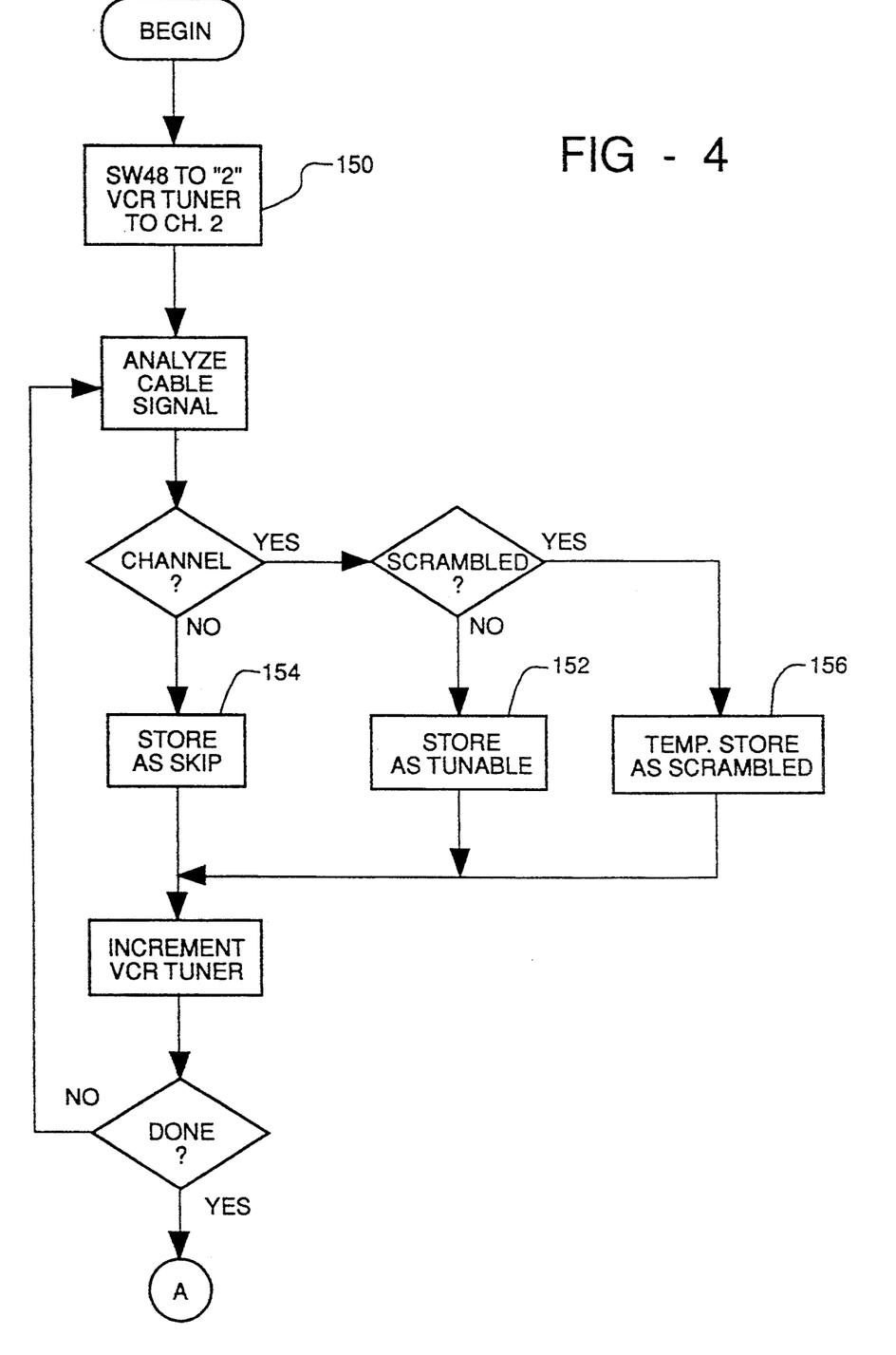
FIG. 4 is a flow diagram illustrating the manner in which the system of the present invention interrogates inputs to determine available channels, including which channels are capable of being descrambled by the cable box.

The flow diagram of FIG. 4 indicates how the present invention scans its inputs to identify tunable channels. By virtue of a program stored in controller 100 the system preferably first begins with the incoming cable by setting switch 48 to the "2" position, at step 150. Controller 100 then analyzes the input for a video signal using sync separator 56 and analyzer 58. If a channel is present it preferably further examines the signal to determine if it is scrambled, in which case it temporarily stores that channel to later determine if the cable box is capable of descrambling it, then increments the VCR tuner. In the preferred embodiment, the controller decides if the signal is scrambled by determining if the horizontal sync is irregular or inverted, although alternative analysis techniques may be used.

If the channel is not scrambled, it is stored as tunable at block 152, and the VCR tuner is incremented. If the channel is scrambled, it may be temporarily stored at step 156 to later determine if it can be unscrambled. If no signal is detected, that channel is stored as untunable and "skipped" block 154. The VCR tuner 46 is incremented through all of its settings at which point the system determines which type of cable box is attached to the VCR and what additional channels are available through descrambling.

Using the control codes associated with the cable box stored in RAM 107, the system determines which channels are capable of being descrambled by the cable box. Preferably, this is accomplished by referring back to the channels temporarily stored as "scrambled" when scanning the direct cable input, then tuning the cable box to those channels to see if they have been descrambled, preferably by confirming that horizontal sync is now periodic and non-inverted. As an alternative technique, the system can simply scan the entire spectrum of channels available from the cable box and store them as tunable or non-tunable to be skipped, without regard to whether they have been descrambled by the cable box. This would eliminate the need to temporarily store and re-reference scrambled channels detected on the cable.

In operation, the present invention knows the status of system resources and keeps a running tab of all tunable channels. The table of FIG. 5 lists attributes of a few channels as they may be organized within RAM 107. A "1" in the table denotes that the tuner associated with the unit listed in that column is capable of tuning program material on that channel. For example, as shown in the first row, only the cable box 24 is capable of tuning channel 02, which would be the case if channel 02 is a scrambled channel. The second row shows that none of the tuners can find program material on channel 03, which is usually the case. The third column shows that all system tuners (44, 46, 70) are capable of tuning channel 04.

Figure 5:
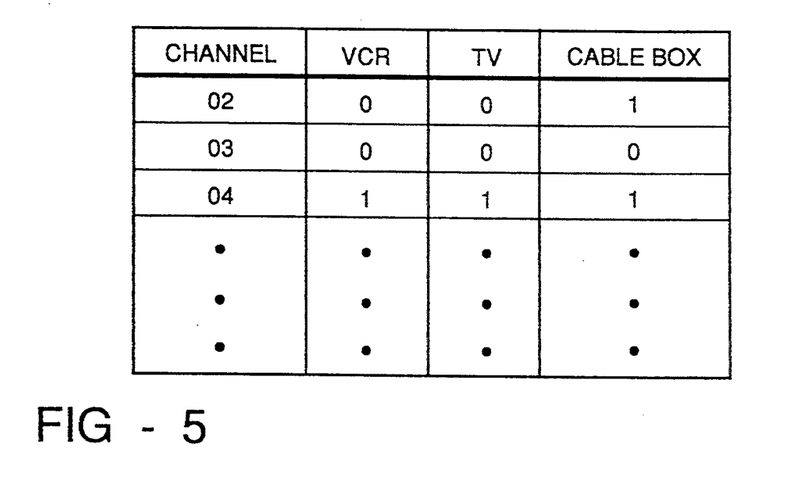
FIG. 5 is a table illustrating how attributes of each channel may be organized in accordance with the present invention.

Thus, if a viewer wished to watch channel 02, that command would be received by user input 102 and transferred to controller 100. Controller 100 would then place switch 96 in position "A" and cause IR transmitter 108 to send a -0-2- channel-select control signal to the cable box and a -0-3- channel-select control signal to the TV.

If more than one tuner is capable of tuning a particular channel, as is the case with channel 04 in FIG. 5, selection of that channel for viewing would preferably cause all tuners to tune to that channel. Controller 100 would place switch 96 in position "C" and cause the TV to tune channel 04 directly from the cable. In this way, if a "RECORD" command were subsequently received by an operator, it would be interpreted to mean record channel 04. Switch 48 would be controlled to position "2," and the tape unit would be activated.

Since the controller 100 stores the status of recording and viewing from all channels, it could inform the operator if a particular request is not possible. For example, if the tape unit is recording a premium channel from the cable box and the user selects a different premium channel for viewing, the invention would send a message to the screen indicating that the only resource capable of tuning that premium channel is in use, and that the recording process would need to be halted to view it. In the event the viewer selected the same pay channel for viewing and recording, the controller would cause switch 96 to select position "B."

Referring to FIG. 6, remote control transmitter 300 of the present invention is specially designed to ensure that the control codes subsequently transmitted to the non-VCR components in accordance with the single user command are accurately received and understood. Thus, unlike conventional remotes, which typically send a continuous stream of the same code until the operator removes his finger from that button, the remote dedicated to the VCR of the present invention will preferable send a single code (or just a few repeats of the same code), followed by a delay to afford subsequent re-transmission of control signals by the IR transmitter 108 to the cable box 24 and/or TV 26. If the button is depressed for an extended time, as would be the case with volume control or channel slew, commands the VCR remote will again transmit only one or a few codes, followed by a delay, thereby affording the VCR another opportunity to re-transmit, and so on, until the operator's finger is lifted.

In an alternative embodiment, a different IR frequency could be used for the dedicated VCR remote or, eliminates "wait states," an RF link could be used for the VCR remote, thus enabling the receipt of user commands and the re-transmission of cable-box and TV directives to occur simultaneously.

Since the VCR 22 stores the identities of all tunable channels and the status of all system resources, it also allows the user to continue to use the remote-control devices that came supplied with the cable box or TV, and operates to avoid potential interference problems. Generally speaking, if the VCR 22 senses a command from a remote other than the one dedicated to the VCR, it will interpret the command and, if executable, carry out the command. If the command would bring about an undesirable result, however., the present invention will allow the command to be executed and then immediately send its own IR signal to reverse the action of the previous command.

Figure 7:
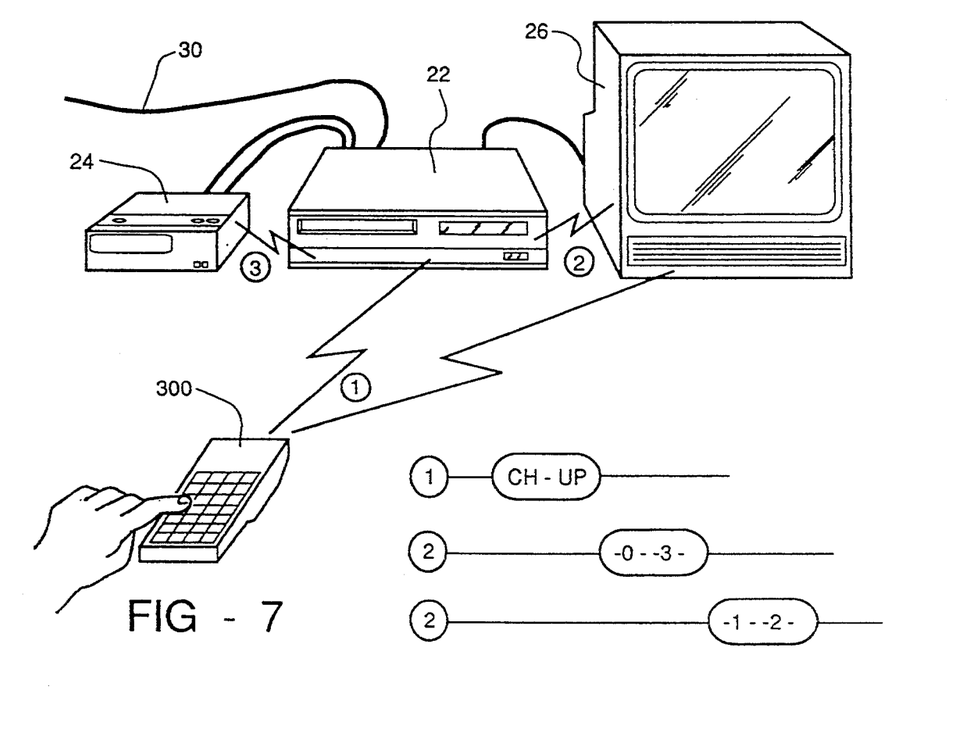
FIG. 7 is an illustration of the interaction among system components upon receipt of a typical command from a remote-control transmitter dedicated to a system resource other than the VCR, such as the television receiver.

FIG. 7 is an illustration of the interaction among system components upon receipt of a command issued from a remote-control transmitter dedicated to a system resource other than the VCR, such as the television receiver 26. Assume that the TV 26 is tuned to channel 11 directly from the cable and a channel-up command is transmitted from the TV's old remote. Assume further that channel 12 is a scrambled channel. The TV cannot accommodate this request, because if it simply increments the TV tuner it will receive channel 12 from the cable feed, which will be scrambled. The controller 100 will then automatically re-tune the TV to channel -0-3-, tune the cable box to -1-2- and make sure that switches 48 and 94 are set appropriately within the VCR. Generally speaking, assuming the tape unit is not tying up the requested resource, if a channel request command is received by the VCR 22, the system will operate to provide that channel from whichever resource has the capability of tuning it.

Having thus described my invention, I claim:

1. A video recorder adapted for use with a multi-channel signal source and a remotely controllable television receiver, the video recorder comprising:
a tuner;
video record/playback means;
a first input to receive a signal from the multi-channel signal source;
an output to deliver a signal to an input of the television receiver;
electrically controlled switches operative to interconnect the tuner and video record/playback means to the multi-channel signal source through the first input and television receiver through the output;
a memory for storing remote control codes for the television receiver;
a remote control signal transmitter;
a source of operator control commands; and
an electronic controller operative to receive operator control commands, cause the transmitter to transmit control signals, to the television, and control the switches in order to achieve video recording and viewing options based upon the operator commands.

2. The video recorder of claim 1, further adapted for use with a remotely controllable tuner/descrambler, and having a second input to receive a signal from an output of the tuner/descrambler, the transmitter being further operative to transmit control codes to both the tuner/descrambler and to the television, the memory further storing remote control codes for the tuner/descrambler.

3. The video recorder of claim 1 in which said source of operator control commands is a voice recognition device responsive to oral operator commands.

4. The video recorder of claim 2, wherein said controller is further connected to an input responsive to the tunability of the television receiver and a memory to store attributes pertaining to channel tunability, said controller being further operative to:
cause the transmitter to transmit channel-change command signals to the tuner/descrambler and to the television receiver;
analyze the resulting operation of the tuner/descrambler and the television receiver in order to determine which channels may be tuned by the tuner/descrambler and by the television receiver; and
store in said memory, as a function of each channel, attributes indicating if said channel is capable of being tuned by said video recorder, tuner/descrambler or television receiver.

5. The video recorder of claim 4 wherein said controller is further operative to determine if said television receiver is cable-ready.

6. The video recorder of claim 1 further including an RF splitter adapted to receive said multi-channel signal source and provide an input to said cable tuner/descrambler and said electronic switching.

7. The video recorder of claim 1 wherein said electronic controller is further operative to receive operator commands transmitted to the tuner/descrambler or television receiver, cause the transmitter to transmit control signals to the tuner/descrambler and to the television receiver, and control the switches in order to achieve video recording and viewing options in accordance with the operator commands.

8. The video recorder of claim 7 wherein the operator commands and the control signals are transmitted at different frequencies.

9. A video routing system configured for use with a multi-channel signal source, an associated remotely controllable tuner/descrambler, and a television monitor, the system comprising:
a multi-channel tuner outputting a baseband video signal;
a video record/playback unit;
a receiver for remotely transmitted operator control commands;
a transmitter of remote control signals to be received by said tuner/descrambler and said television receiver;
electronically controllable baseband video switching means; and
a controller operative to receive operator originated control signals from said remote control transmitter relating to desired scenario associated with viewing or recording, and to control said switching means so as to interconnect the elements of the video recorder to one another and to the multi-channel signal source, tuner/descrambler and monitor, and cause the transmitter to generate control commands for the tuner/descrambler and the television receiver to enable said scenario.

10. The video recorder of claim 9 wherein said electronically controllable switching means includes:

a record select switch operative to choose one of the following as the record input to said magnetic record/playback unit:
the output of said multi-channel tuner; and
a video output of said cable tuner/descrambler; and
a view select switch operative to choose as an input to said television one of:
the output of said multi-channel tuner;
the output of said magnetic record/playback unit; and
a video output of said tuner/descrambler.

11. The video recorder of claim 9 wherein said viewing and recording scenarios include:
recording a descrambled cable channel while viewing:
the same descrambled cable channel;
a cable channel; or
recording a cable channel while viewing:
the same cable channel;
a different cable channel; or
a descrambled cable channel.

12. The video recorder of claim 9 further comprising a memory connected to the controller for storing the remote control codes for said tuner/descrambler and said television receiver.

13. In a video recorder adapted for use in conjunction with a multi-channel signal source, a remotely controllable cable tuner/descrambler and a remotely controllable television receiver, the video recorder including a tuner, video record/playback means, electrically controlled switches operative to interconnect the tuner, video record/playback means, multi-channel signal source, tuner/descrambler and television receiver, a remote-control signal transmitter adapted to transmit control signals to the tuner/descrambler and to the receiver, and a source of operator control commands, the method of configuring the video recorder, tuner/descrambler and television receiver for a desired recording/viewing option, comprising the steps of:

receiving at said recorder an operator command specifying the option;
tuning the tuner;
setting the switches;
energizing the record/playback means;
energizing and tuning the tuner/descrambler; and
energizing and tuning said television receiver.

14. The method of claim 13 wherein the step of receiving at said recorder an operator command specifying the option includes receiving an operator command transmitted to the tuner/descrambler or receiver.

15. The method of claim 13 further including the steps of:
transmitting channel-change command signals to the tuner/descrambler and to the receiver;
analyzing the resulting operation of the tuner/descrambler and the receiver in order to determine which channels may be tuned by the tuner/descrambler and by the receiver; and
storing in a memory, as a function of each channel, attributes indicating if said channel is capable of being tuned by said video recorder, tuner/descrambler or receiver.

16. The method of claim 15, wherein the step of analyzing the resulting operation of the tuner/descrambler in order to determine which channels may be tuned by the tuner/descrambler includes analyzing the resulting operation in order to determine if a channel is capable of being descrambled by the tuner/descrambler.

17. The method of claim 16 wherein the step of analyzing the resulting operation of the tuner/descrambler in order to determine if a channel is capable of being descrambled by the tuner/descrambler includes the steps of:
analyzing the synchronization of an output signal of the tuner/descrambler to determine if it is periodic; and
analyzing the synchronization of said tuner/descrambler output signal, if periodic, to determine if it is inverted.

* * * * *

UNITED STATES PATENT AND TRADEMARK OFFICE
CERTIFICATE OF CORRECTION

PATENT NO. : 5,420,647
DATED : May 30, 1995
INVENTOR(S) : Levine

It is certified that error appears in the above-indentified patent and that said Letters Patent is hereby corrected as shown below:

Column 1, line 7: Replace "08,005,727" with --08/005,727--.

Column 7, line 18: Replace "however.," with --however,--.

Column 8, line 59: Replace "to desired" with --to a desired--.

Column 9, line 37: Before "receiver" insert --television--.

Column 10, line: after "before "receiver" insert --television--.

Column 10, line 15: Before "receiver" insert --television--.

Column 10, line 17: Before "receiver" insert --television--.

Column 10, line 19: Before "receiver" insert --television--.

Column 10, line 23: Before "receiver" insert --television--.

Signed and Sealed this

Twenty-first Day of November, 1995

Attest:

BRUCE LEHMAN

Attesting Officer     Commissioner of Patents and Trademarks